US012675326B2

(12) United States Patent
Chen et al.

(10) Patent No.: US 12,675,326 B2
(45) Date of Patent: Jul. 7, 2026

(54) CLOUD CLUSTER STORAGE RESOURCE AUTOSCALER

(71) Applicant: Red Hat, Inc., Raleigh, NC (US)

(72) Inventors: Huamin Chen, Westboro, MA (US); Chen Wang, Chappaqua, NY (US); Yuval Lifshitz, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 914 days.

(21) Appl. No.: 17/850,774

(22) Filed: Jun. 27, 2022

(65) Prior Publication Data

US 2023/0418671 A1 Dec. 28, 2023

(51) Int. Cl.
*G06F 9/50* (2006.01)
(52) U.S. Cl.
CPC .................................. *G06F 9/5016* (2013.01)
(58) Field of Classification Search
CPC ...................................................... G06F 9/5016
See application file for complete search history.

(56) References Cited

U.S. PATENT DOCUMENTS

| | | | | |
|---|---|---|---|---|
| 9,547,534 | B2 | 1/2017 | Dettori et al. | |
| 10,503,553 | B1 | 12/2019 | Ashok et al. | |
| 10,740,009 | B2 * | 8/2020 | Chen ..................... | G06F 3/0629 |
| 11,102,282 | B2 | 8/2021 | Chatt et al. | |
| 2008/0062886 | A1 * | 3/2008 | Tang ...................... | H04L 47/70 |
| | | | | 370/252 |
| 2021/0173719 | A1 | 6/2021 | Chester et al. | |
| 2022/0417173 | A1 * | 12/2022 | Jijumon .............. | H04L 43/0852 |

OTHER PUBLICATIONS

Weil et al. ("CRUSH: Controlled, Scalable, Decentralized Placement of Replicated Data", Storage Systems Research Center, University of California, Santa Cruz, Nov. 2006). (Year: 2006).*
Using the Kubernetes Vertical Pod Autoscaler, Oracle Cloud Infrastructure Documentation, 2022.
Hasham Haider, Kubernetes Autoscaling in Production: Best Practices for Cluster Autoscaler, HPA and VPA, replex.io, Dec. 5, 2019.
Vertical Pod Autoscaling, Kubernetes Engine Documentation, Google Cloud, Feb. 15, 2022.

* cited by examiner

*Primary Examiner* — Wissam Rashid
(74) *Attorney, Agent, or Firm* — Womble Bond Dickinson (US) LLP

(57) ABSTRACT

Methods, systems, and computer program products herein provide operations or techniques for managing resource allocation in a data storage environment. According to aspects of the present disclosure, one or more storage nodes of hierarchy on a common hierarchy level are identified as a management group. For example, the one or more storage nodes of hierarchy may include one or more object storage daemons (OSDs) of a controlled replication under scalable hashing (CRUSH) group or the like. The resource utilization in a subset of the one or more storage nodes in the management group are monitored. Based on the monitored resource utilization, a processing device may determine respective scaling factors for allocating resources to the one or more storage nodes in the management group. The processing device may then adjust the resource allocation using the respective scaling factors in the one or more storage nodes.

17 Claims, 6 Drawing Sheets

100

200

300

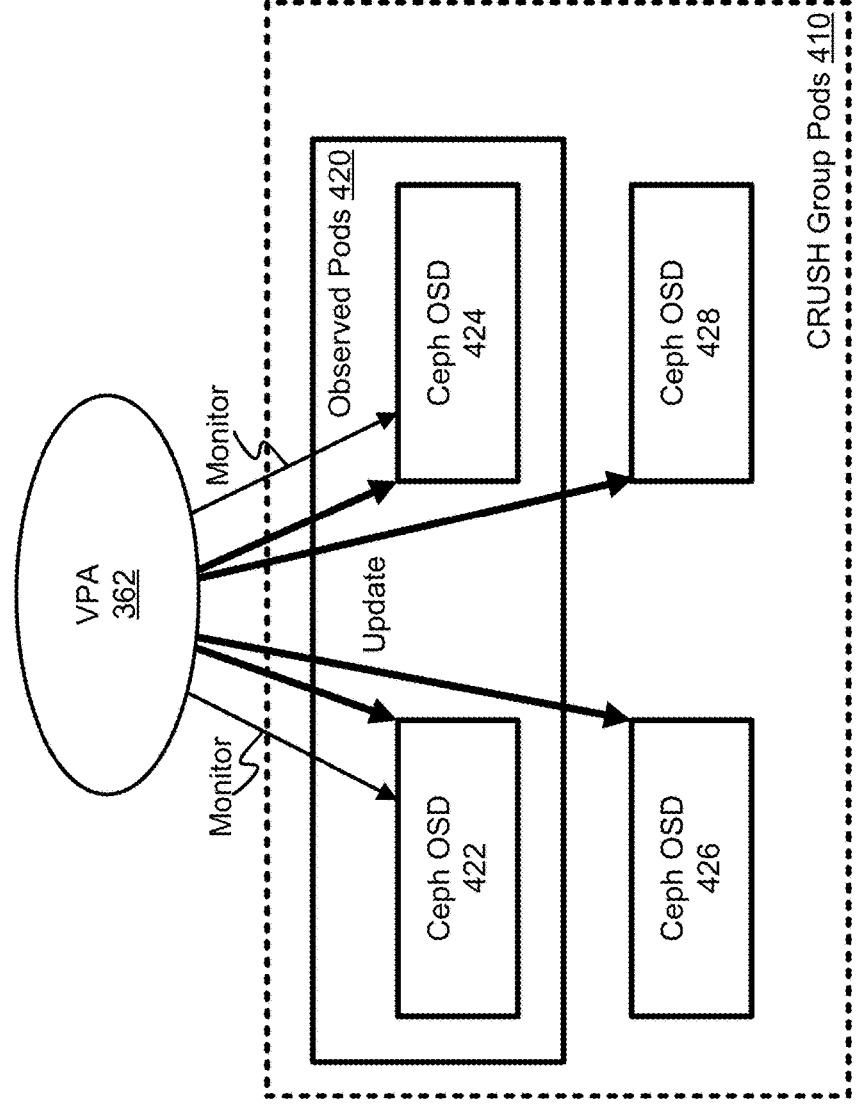
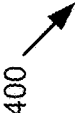
FIG. 4

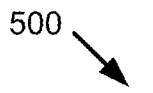

500

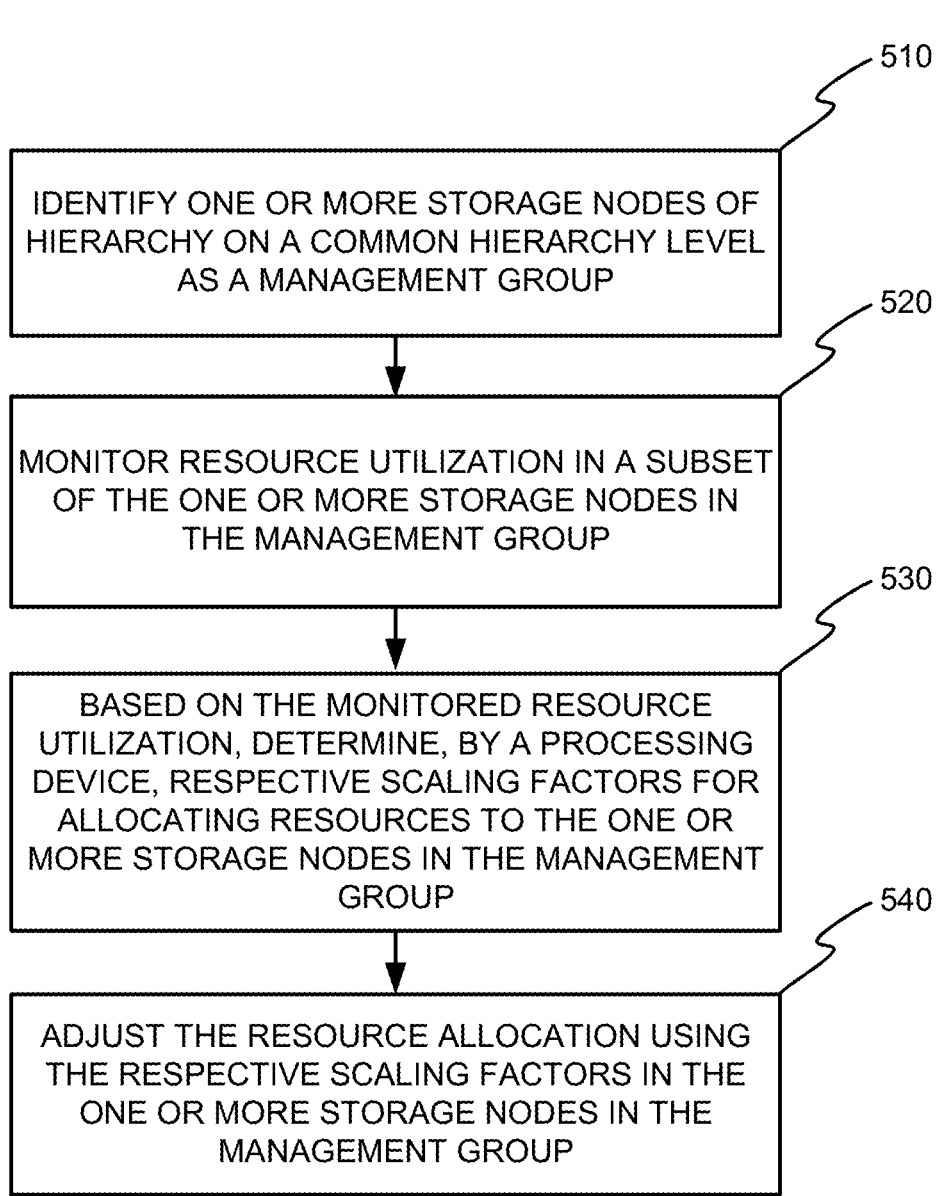

510

IDENTIFY ONE OR MORE STORAGE NODES OF
HIERARCHY ON A COMMON HIERARCHY LEVEL
AS A MANAGEMENT GROUP

520

MONITOR RESOURCE UTILIZATION IN A SUBSET
OF THE ONE OR MORE STORAGE NODES IN
THE MANAGEMENT GROUP

530

BASED ON THE MONITORED RESOURCE
UTILIZATION, DETERMINE, BY A PROCESSING
DEVICE, RESPECTIVE SCALING FACTORS FOR
ALLOCATING RESOURCES TO THE ONE OR
MORE STORAGE NODES IN THE MANAGEMENT
GROUP

540

ADJUST THE RESOURCE ALLOCATION USING
THE RESPECTIVE SCALING FACTORS IN THE
ONE OR MORE STORAGE NODES IN THE
MANAGEMENT GROUP

CLOUD CLUSTER STORAGE RESOURCE AUTOSCALER

TECHNICAL FIELD

Aspects of the present disclosure relate to data storage services.

BACKGROUND

Data services providing storage, backup, and distribution functions are expected to have a low response latency, which may be achieved by reduced data movement (e.g., accessed at a location close to where the data is stored). Often, operations of privacy preservation and attack detection (e.g., ransomware scanning) are instrumented in the computational storage backend, to ensure the persisted data are in compliance with local regulations.

To perform these functions (e.g., storage, backup, distribution, privacy protection, attack detection, etc.), the data services need to allocate sufficient resources (e.g., computational capacity, bandwidth, etc.) for the inline data processing pipelines. These resources are often requested before knowing the actual workload. If excessive resources are provisioned in advance, the overall data service may underutilize available resources, cause unnecessary idle, and result in inefficiency. On the other hand, if the resources are under-provisioned, the data services may fail to meet to data ingestion or intake velocity and cause delay or increase in response latency.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the scope of the described embodiments.

FIG. 4 illustrates an example block diagram of a VPA managing resource allocations for a group of pods, in accordance with one or more aspects of the disclosure.

FIG. 5 is a flow diagram of a method of managing resource allocation in a data storage environment, in accordance with one or more aspects of the disclosure.

Like numerals indicate like elements.

DETAILED DESCRIPTION

The present disclosure provides techniques, processes, devices, and systems for managing resource allocation in a data storage environment. According to aspects of the present disclosure, one or more storage nodes of hierarchy on a common hierarchy level are identified as a management group. For example, the one or more storage nodes of hierarchy may include one or more object storage daemons (OSDs) of a controlled replication under scalable hashing (CRUSH) group or the like. The resource utilization in a subset of the one or more storage nodes in the management group are monitored. Based on the monitored resource utilization, a processing device may determine respective scaling factors for allocating resources to the one or more storage nodes in the management group. The processing device may then adjust the resource allocation using the respective scaling factors in the one or more storage nodes.

According to aspects of the present disclosure, a vertical pod autoscaler (VPA) may be used to manage the resource allocation of OSDs in a CRUSH group. Conventional VPA monitors each OSD and spends resources (computational resources, such as processing capacity and memory) in doing so. Such resource consumption may be cost or computationally prohibitive when a storage cluster involves a large number of OSDs. That is, monitoring each OSD prevents the conventional VPA from being scalable without consuming additional resources. The present disclosure provides techniques that overcome such drawbacks. Because the VPA herein may monitor only a subset (instead of all) of the OSDs in the CRUSH group while control all OSDs in the management group, the resources consumed by the VPA is limited while the scalability of the VPA (e.g., application to a large, dynamic number of OSDs) has been extended.

Figure 2:
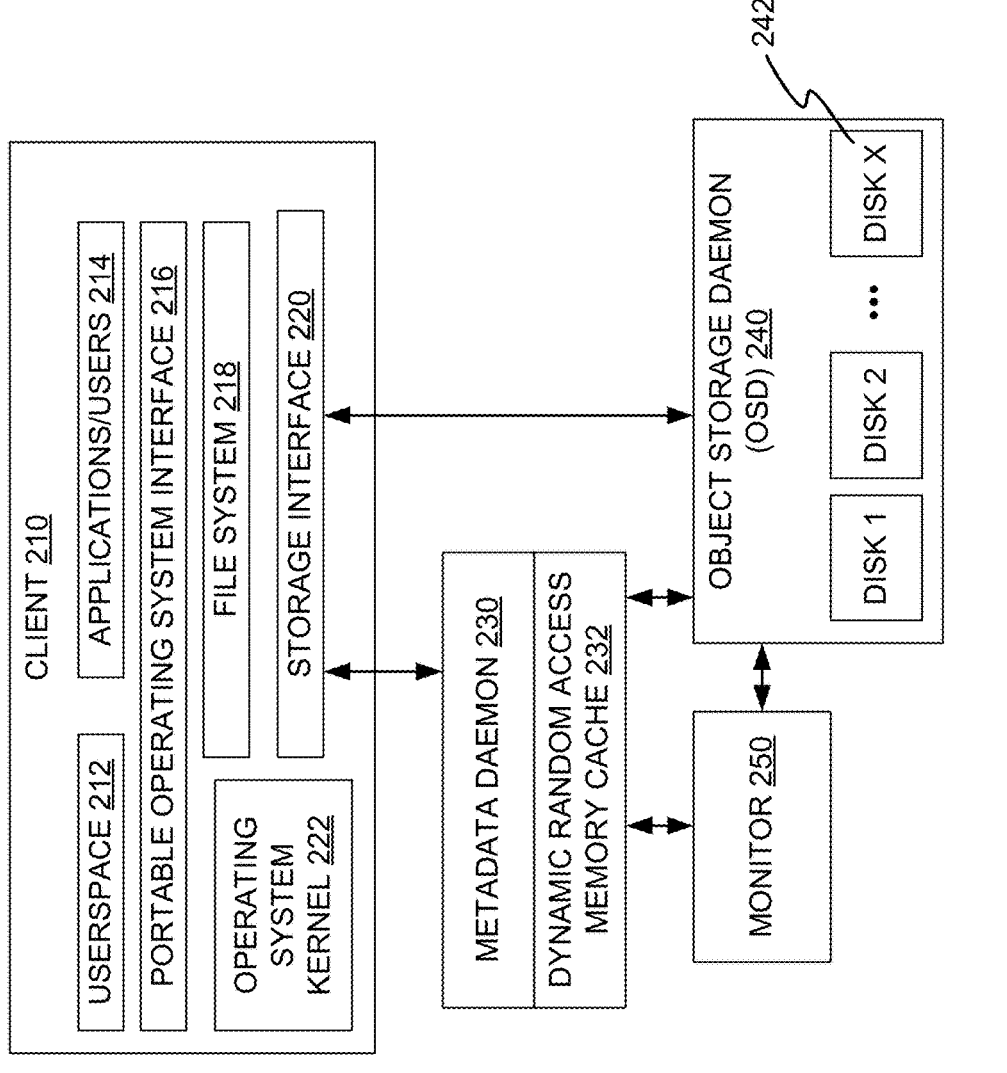
FIG. 2 is a schematic diagram illustrating an example client data handling structure, in accordance with one or more aspects of the present disclosure.

In some cases, the VPA disclosed herein optimizes its scalability by reducing the number of OSDs, or Pods using the CRUSH algorithm, being monitored (OSDs are further discussed in relation to FIG. 2). The CRUSH algorithm may be an algorithm of Ceph™. An example method based on the algorithm may include identifying or finding a number of OSDs in a common CRUSH group. A CRUSH group randomizes the use of OSDs such that new and old data are not concentrated to new or old OSDs. The identified OSDs may be referred to as CRUSH group Pods. The example method then assigns a VPA to monitor a subset of the OSD Pods. The monitored OSD Pods may be referred to as observed Pods. The resources needed for the VPA to monitor the observed Pods are much less than the resources needed for the VPA to monitor the CRUSH group Pods. In existing Ceph OSD Pods, resources assigned, requested, or claimed, are often static and do not change during operation. The resource request is not based on actual workloads, which may be dynamics. The present disclosure uses the scalable VPA to overcome such inefficiencies caused by static resource allocations.

As the VPA monitors the observed Pods, the VPA may timely determine whether the observed Pods have been assigned (or initially requested) a proper amount of resources commensurate with the workload. When the VPA determines that the currently assigned resources to the observed Pods need be updated based on the actual workload, the VPA may update all the CRUSH group Pods (e.g., proportional to respective weight in the group). As such, the CRUSH group Pods may be timely updated based on the situations of the observed Pods, enabling efficient VPA resources consumption and scalability.

In some cases, the disclosed VPA may apply to storage platforms that include a block, file, and object storage operating on industry-standard servers and internet protocols, such as CEPH™ storage or Red Hat™ Ceph Storage. The storage platform performs distributed operation without a single point of failure and is scalable to large data size levels. The storage platform may replicate data to improve fault tolerance. The storage platform enables disaster recovery and data redundancy through techniques such as replication, erasure coding, snapshots, and storage cloning. As such, the storage platform may self-restore, self-manage, and minimize administrative time and operational costs.

Figure 1:
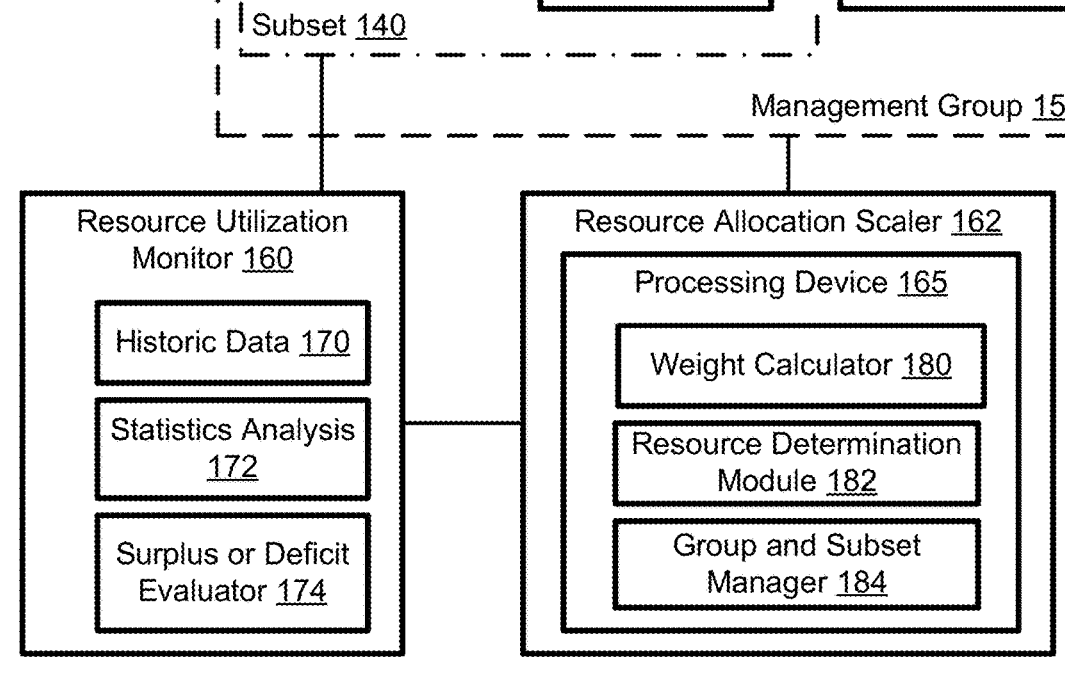
FIG. 1 depicts a high-level component diagram of an illustrative example of a data storage environment that manages resource allocation, in accordance with one or more aspects of the present disclosure.

FIG. 1 depicts a high-level component diagram of an illustrative example of a data storage environment 100 that manages resource allocation, in accordance with one or more aspects of the present disclosure. As shown, the data storage environment 100 may include a number of storage nodes of hierarchy, such the level 1 node 110, the level 2 nodes 120 and 122, and the level 3 nodes 130, 132, 134, and 136. In some cases, the level 1 node 110 may include a rack bucket; the level 2 nodes A 120 and B 122 may include host buckets, and the level 3 nodes i 130 through iv 136 may include OSD buckets. Other level 3 nodes x 137 and y 139 that are not based on the level 2 nodes A 120 and B 122 may also be identified and grouped into the management group 150.

The number of storage nodes of hierarchy may be types of buckets in a CRUSH map. The CRUSH map pseudo-randomly store and retrieve data in OSDs with a uniform distribution of data across a cluster. The data storage locations are computed by the CRUSH algorithm that determines how to store and retrieve data. Clients of the data services using the CRUSH algorithms may communicate with OSDs directly instead of through a centralized server or broker. The CRUSH algorithm may thus avoid a single point of failure, a performance bottleneck, or a physical limit to scalability. The CRUSH map includes a list of OSDs, a list of buckets for aggregating devices into physical locations, and a list of rules that direct how data are replicated in the cluster pools. The CRUSH map may model and address potential sources of correlated device failures by reflecting the underlying physical organization of the installation (e.g., proximity, shared power sources, or shared networks). CRUSH placement policies may separate object replicas across different failure domains while still maintain the desired distribution. For example, data replicas are on devices using different shelves, racks, power supplies, controllers, and/or physical locations.

The location of an OSD in terms of the CRUSH map's hierarchy may be referred to as a CRUSH location, which may take the form of a list of key and value pairs describing a position. The CRUSH algorithm distributes data objects among storage devices according to a per-device weight value, approximating a uniform probability distribution. Data objects and their replicas are distributed according to the hierarchical cluster map. A bucket hierarchy may segregate the leaf nodes (e.g., OSD buckets) by failure domains, such as hosts, chassis, racks, power distribution units (PDU), pods, rows, rooms, and data centers. Although examples herein use OSD buckets as examples for the one or more storage nodes of hierarchy, other storage nodes of hierarchy on a common hierarchy level may use the techniques and methods of the present disclosure as well. For example, the one or more storage nodes of a common hierarchy level may include OSDs, hosts, chassis, racks, rows, PDUs, Pods, rooms, data centers, regions, and/or roots.

In FIG. 1, multiple level 3 nodes 130, 132, 134, 136, 137, and 139 are identified as or grouped into the management group 150. In the management group 150, a subset of the level 3 nodes 132, 134, and 137 are grouped as the subset 140, which is monitored by the resource utilization monitor 160. The resource utilization monitor 160 monitors the resource utilization of the subset 140 in the management group 150. The resource utilization monitor 160 is coupled to a resource allocation scaler 162, which may update and/or adjust the resource allocation in the management group 150 if needed. For example, based on the monitored resource utilization of the subset 140 (e.g., each node in the subset 140), the processing device 165 of the resource allocation scaler 162 may determine respective scaling factors for allocating resources to the one or more storage nodes in the management group 150 when the resources originally assigned are underutilized or insufficient to meet demands of the nodes 132, 134, and/or 137.

The resource utilization monitor 160 may acquire and store historic data 170 of the resource utilization by the nodes of the subset 140. The resource utilization monitor 160 may perform statistical analysis or analyses 172 on the historic data 170, as the actual resource utilization may fluctuate and subject to measurement errors or noises. The resource utilization monitor 160 may evaluate and/or determine any surplus or deficit, using the surplus or deficit evaluator 174, in the assigned resources in each node in the subset 140.

At least partially because of the random or pseudo-random distribution nature of the CRUSH algorithm, the nodes 132, 134, and 137 in the subset 140 may have different resource utilizations in a general conforming trend, such that the statistical analysis 172 may expect a non-contradictory surplus or deficient evaluation. For example, the original request for resources in the nodes 132, 134, and 137 may likely be greater than, equal to, or less than the actual workload requirements. In cases where the surplus and deficit determinations result in contradictory trends, the resource utilization monitor 160 may report to the resource allocation scaler 162 regarding such irregularity and allow the resource allocation scaler 162 to generate respective scalers based on the report.

The resource allocation scaler 162 may use the processing device 165 to determine updates and/or adjustments to the resource allocations in the nodes of the management group 150. The processing device 165 may include a weight calculator 180, a resource determination module 182, and a group and subset manager 184. The weight calculator 180 may determine the relative traffic or data handling weight among the nodes in the subset 140. For example, the weight calculator 180 may identify a relative percentage, such as 40%, 35%, and 25%, of the traffic or data handled by the nodes 132, 134, and 137. Based on such weighted values, the processing device 165 may associate other nodes not included in the subset 140, with the identified weights. For example, as the node 136 shares the same host bucket (the level 2 node B 122), the traffic or data handled by the node 136 may be similar to that of the node 134, even though the node 136 in the management group 150 is out of the subset 140 and is not monitored by the resource utilization monitor 160.

The resource determination module 182 may intake the information provided by the resource utilization monitor 160 and the weight information from the weight calculator 180 to determine respective scaling factors for the nodes in the management group 150. The determined scaling factors may optimize resources of the nodes in the subset 140 (as well as the management group 150). For example, for ease of explanation, assuming that the nodes in the management group 150 are weighted equally in terms of traffic or data handling, when the resource determination module 182 determines based on the resource utilization statistics provided by the resource utilization monitor 160 that the nodes 132, 134, and 137 in the subset 140 are underutilizing resources assigned by 20% (e.g., actual demand for the resources is 80% of the requested resources), the resource determination module 182 may determine a 0.8 scaling factor for adjusting the resources in the nodes in the management group 150. The freed resources may be used by other nodes outside of the management group 150 if needed, or reserved in a form of energy conservation (e.g., reduced power consumed by CPU and memories).

On the other hand, when the resource determination module 182 determines that the actual workload faced by the nodes in the subset 140 is 20% more than the resources assigned, the resource determination module 182 may determine a 1.2 scaling factor for adjusting the resources in the nodes in the management group 150. This allows for all nodes in the management group 150 to be adjusted to have the computational capacity to handling incoming tasks without delays caused by insufficient initial resource requests.

The group and subset manager 184 may determine and update the nodes in the subset 140 and/or the nodes in management group 150. For example, the group and subset manager 184 may identify which nodes on the common hierarchy to be included in the management group 150 based on properties of the nodes and the capacity of the resource allocation scaler 162 (e.g., whether the resource allocation scaler 162 may alter the resource allocation in a node).

The group and subset manager 184 may adjust the inclusion of nodes in the subset 140. For example, to allow the resource utilization monitor 160 and the resource allocation scaler 162 (e.g., collectively embodying a VPA) to limit resources consumption, when monitoring the resource utilization and computing the scaling factors may be computationally costly as the number of nodes monitored increases, the group and subset manager 184 may change the nodes included in the subset 140. The inclusion of the nodes in the subset 140 may be determined based on representation and resource conservation. For example, the group and subset manager 184 may include nodes in the subset 140 that represents the nodes of the management group 150 while not unnecessarily spending computational resources on repetitive or irrelevant nodes.

During operation, the group and subset manager 184 may adjust the subset 140 of the one or more storage nodes in the management group 150 based on resources consumed on monitoring the resource allocation by the resource utilization monitor 160. In some cases, the group and subset manager 184 may adjust the one or more storage nodes in the management group 150 based on the resource consumed on monitoring or adjusting the resource allocation. In some cases, the resource allocation includes at least one of a bandwidth of data processing, a share of a total computational capacity, a share of available memory resource, a portion of input and output bandwidth, or a share of communication bandwidth. For example, the bandwidth of data processing may include various aspects of CPU, memory, network, bus, or data transfer performances. The communication bandwidth may include various aspects of frequency domain, time domain, transmission direction, latency, signal strength, or antennas resource allocation.

FIG. 2 is a schematic diagram illustrating an example client data handling structure 200, in accordance with one or more aspects of the present disclosure. As shown, the client 210 may exchange information with the metadata daemon 230 and the object storage daemon (OSD) 240. The client 210 may include any data user(s). The metadata daemon 230 may include any metadata server(s) that may cache and synchronize distributed data. The OSD 240 may include any object storage cluster(s) that stores both metadata and data as objects. The metadata daemon 230 and the OSD 240 may both communicate with the monitor 250, which may include any cluster monitor(s) that oversees activities in the OSD 240 and the metadata daemon 230. The OSD 240 includes one or more disks 242 for storing data objects and the like. The metadata daemon 230 includes the dynamic random access memory cache 232 for exchanging information with the OSD 240 and the monitor 250.

The client 210 includes user space 212, applications or users 214, a portable operating system interface 216, a file system 218, an operating system kernel 222, and a storage interface 220. In aspects, the client 210 may identify locations of data using the metadata daemon 230 via the storage interface 220. The metadata daemon 230 may manage the location of data (e.g., including identifying new locations of incoming data) and manage functions such as opening, closing, and renaming. The OSD 240 may manage reading and writing of the incoming data. In general, the monitor 250 may track the health of the OSD 240 and the disks 242 therein. The monitor 250 may maintain a map of information for each component (e.g., in a cluster map). The OSD 240 stores data for the client 210 in one or more physical disks 242, which may take on any form, such as hard drives, solid state drives, or the like. The metadata daemon 230 may record file hierarchy and store metadata for the file system 218. In some cases, the client 210 may provide access to servers via the storage interface 220. The client data handling structure 200 may be managed by a management layer (e.g., a control layer over the OSD 240, the metadata daemon 230, and the monitor 250) for data replication, failure detection, attack detection, recovery, and/or migration.

In aspects, the client 210 may provide its user a view of data above the underlying operations with the metadata daemon 230, the OSD 240, and the monitor 250. For example, the user may see a mount point to perform standard file operations. In some cases, the file system 218 and the storage interface 220 may be implemented via the operating system kernel 222, such as a Linux kernel. The file system 218 intelligence may be distributed to multiple nodes of the management layer, for large scale storage (e.g., by assigning an inode number (INO) to a file by the metadata daemon 230). A file with an assigned INO may be divided into multiple objects (e.g., based on the size of the file). Each object may be identified based on an object ID (OID) and assigned to a placement group based on a simple hash of the OID.

Objects may be stored in a conceptual container, which is mapped to object storage devices by pseudo-random mapping, without reliance on the metadata. The conceptual container may be identified by a placement group identifier (PGID). For example, the client 210 may retrieve stored objects from the OSD 240 via the storage interface 220 based on the pseudo-random mapping and not based on the metadata stored in the metadata daemon 230. The use of pseudo-random mapping allows for reduction of storage overhead and simplification of data distribution and lookup. In some cases, a cluster map may be used to represent the devices (e.g., disks 242) representing a storage cluster. As such, any object may be located (or allocated) based on PGID and the corresponding cluster map.

Figure 3:
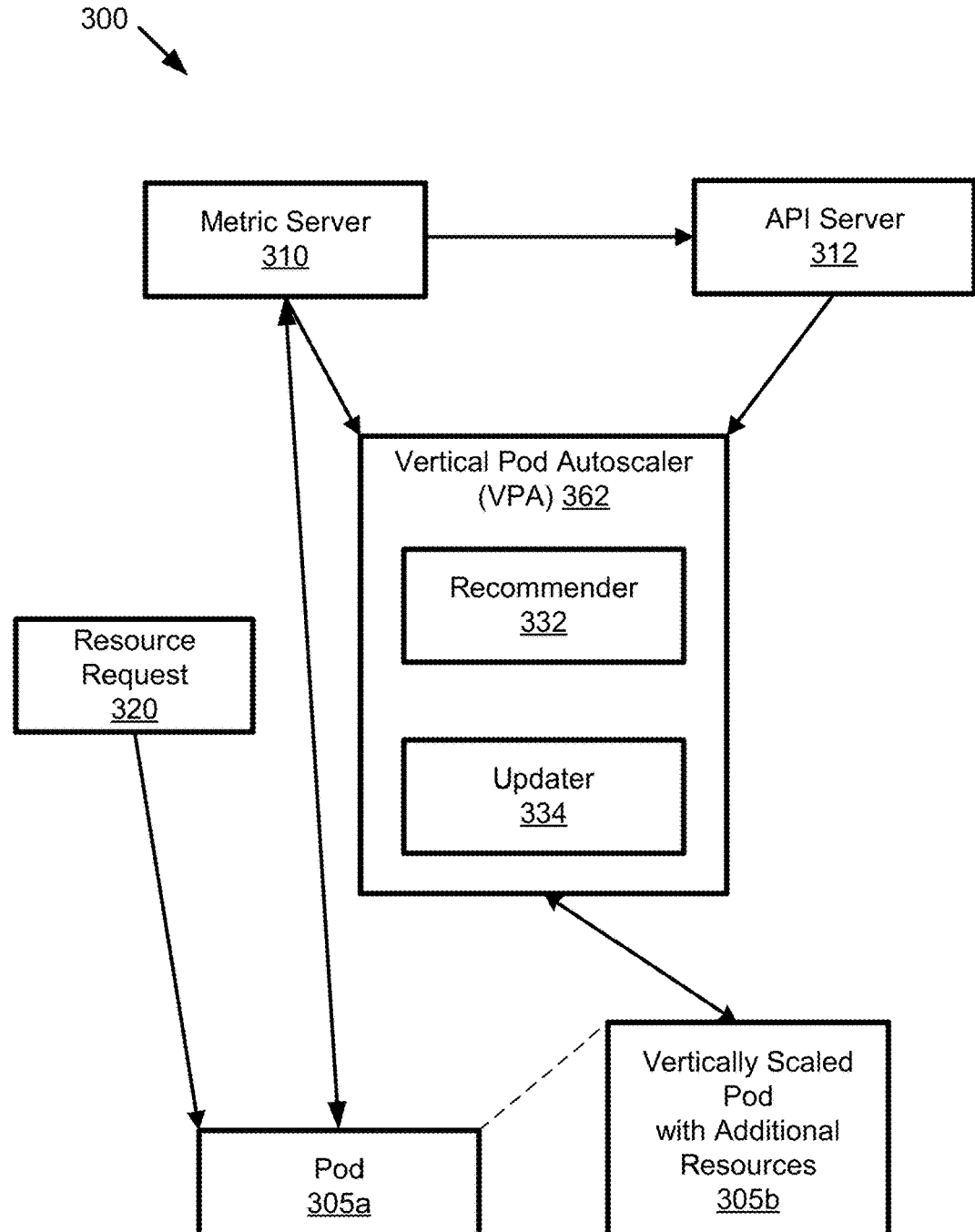
FIG. 3 depicts a high-level component diagram of a vertical pod autoscaler (VPA), in accordance with one or more aspects of the disclosure.

FIG. 3 depicts a high-level component diagram 300 of a vertical pod autoscaler (VPA) 362, in accordance with one or more aspects of the disclosure. As shown, the VPA 362 may size the Pod 305*a* into the Pod 305*b* (e.g., same Pod but with increase resources) for optimal CPU and memory resources required by the Pods. "Optimal" may be characterized by an absent of idle CPU or memory resources while the processing tasks at the Pod 305a can be timely handled (e.g., without unexpected delay or latency).

Before operations by the VPA 362, the storage service hosting the Pod 305a may send a resource request 320 to obtain and assign CPU and memory resources for the Pod 305a. The resource request 320 does not consider the actual workload at the Pod 305a. In the example shown, the actual workload is higher than the requested resources, resulting in applications at the Pod 305a being throttled or bottlenecked, or even failing due to out-of-memory errors. On the other hand, if the requested resources well exceed the need by the Pod 305a, the idling resources are wasted.

The metric server 310 may monitor the resource utilization at the Pod 305a. In some cases, the metric server 310 may be similar to the resource utilization monitor 160 of FIG. 1. The metric server 310 may provide the monitored resource utilization statistics and/or history to the VPA 362. The API server 312 allows the VPA 362 to request specific types of resource utilization from the metric server 310.

The VPA 362 includes a recommender 332 and an updater 334. The recommender 332 may, based on the resource utilization received from the metric server 310, determine a proper resource allocation recommendation for the Pod 305a. The recommender 332 may operate in a similar manner as the resource determination module 182. The updater 334 updates the resource allocation for the Pod 305a and adjusts the Pod 305a to the Pod 305b (e.g., with increased CPU and memory allocation). In some cases, the VPA 362 may be configured to operate along with horizontal pod scaling (e.g., by adding or removing pods).

FIG. 4 illustrates an example block diagram 400 of a VPA managing resource allocations for a group of pods 410, in accordance with one or more aspects of the disclosure. As shown, the VPA 362 may be assigned with a group of CRUSH pods (CRUSH group pods 410) to monitor. The VPA 362 monitors, for example, the velocity of data ingestion of the observed pods 420. The observed pods 420 may include a subset of the pods in the CRUSH group pods 410. For example, the VPA 362 monitors the resource utilization of the Ceph OSD 422 and the Ceph OSD 424.

Based on the resource utilization at the Ceph OSDs 422 and 424, the VPA 362 determines a respective scaling factor based on the actual workload in each of the pods and the respective weights in the CRUSH group. The VPA 362 then updates all the pods in the CRUSH group pods 410 with the determined respective scaling factors. That is, the VPA 362 applies the respective scaling factors to the Ceph OSDs 422, 424, 426, and 428. As such, the scalability of the VPA 362 is not limited by an allowed number of VPAs (e.g., data clusters may impose an upper limit to the number of VPAs allowed for each cluster) or resources available to VPAs (e.g., computational resources needed for monitoring and updating the pods).

FIG. 5 is a flow diagram of a method 500 of performing resource allocation management in a data storage environment, in accordance with one or more aspects of the disclosure. The method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by the resource allocation scaler 162 of FIG. 1, or the VPA 362 of FIG. 3 or 4.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at 510, by identifying one or more storage nodes of hierarchy on a common hierarchy level as a management group. For example, the one or more storage nodes of hierarchy comprise one or more object storage daemons (OSDs) of a controlled replication under scalable hashing (CRUSH) group. The one or more OSDs are on the common hierarchy level of pods in the CRUSH group.

At 520, resource utilization in a subset of the one or more storage nodes in the management group is monitored. In some cases, a VPA is assigned to monitor the subset of the one or more storage nodes in the management group. For example, a metric server, such as the metric server 310 of FIG. 3, or a resource utilization monitor, such as the resource utilization monitor 160 of FIG. 1, may be used.

At 530, a processing device determines, based on the monitored resource utilization, respective scaling factors for allocating resources to the one or more storage nodes in the management group. For example, the processing device may optimize resources in the subset of the one or more storage nodes using the VPA, such as the VPA 362 or the resource allocation scaler 162 of FIG. 1. Optimization may be achieved, for example, by efficient use of the resources allocated to each of the pods in the subset of the management group when no unexpected delays or latencies result. In some cases, determining the respective scaling factors may include evaluating, by the VPA, a surplus or a deficit of resource utilization in the subset of the one or more storage nodes during optimization. The respective scaling factors are computed in view of respective weights of the one or more storage nodes in the management group.

At 540, the processing device adjusts the resource allocation using the respective scaling factors in the one or more storage nodes in the management group. For example, the resource allocation may include at least one of: a bandwidth for data processing, a share of a total computational capacity, a share of available memory resource, a portion of input and output bandwidth, or a share of communication bandwidth.

In aspects, the method 500 may be performed in a storage environment (e.g., FIG. 1) that implements object storage on a single distributed computer cluster and provides integrated interfaces for at least one of: object-level, block-level, or file-level storage. The frontend includes a presentation layer or protocol of a reliable, autonomous, distributed object store (RADOS) gateway (RGW). The backend includes a data access layer or storage of an object storage daemon (OSD). For example, the storage platform may include a Red Hat® Ceph® Storage platform.

Figure 6:
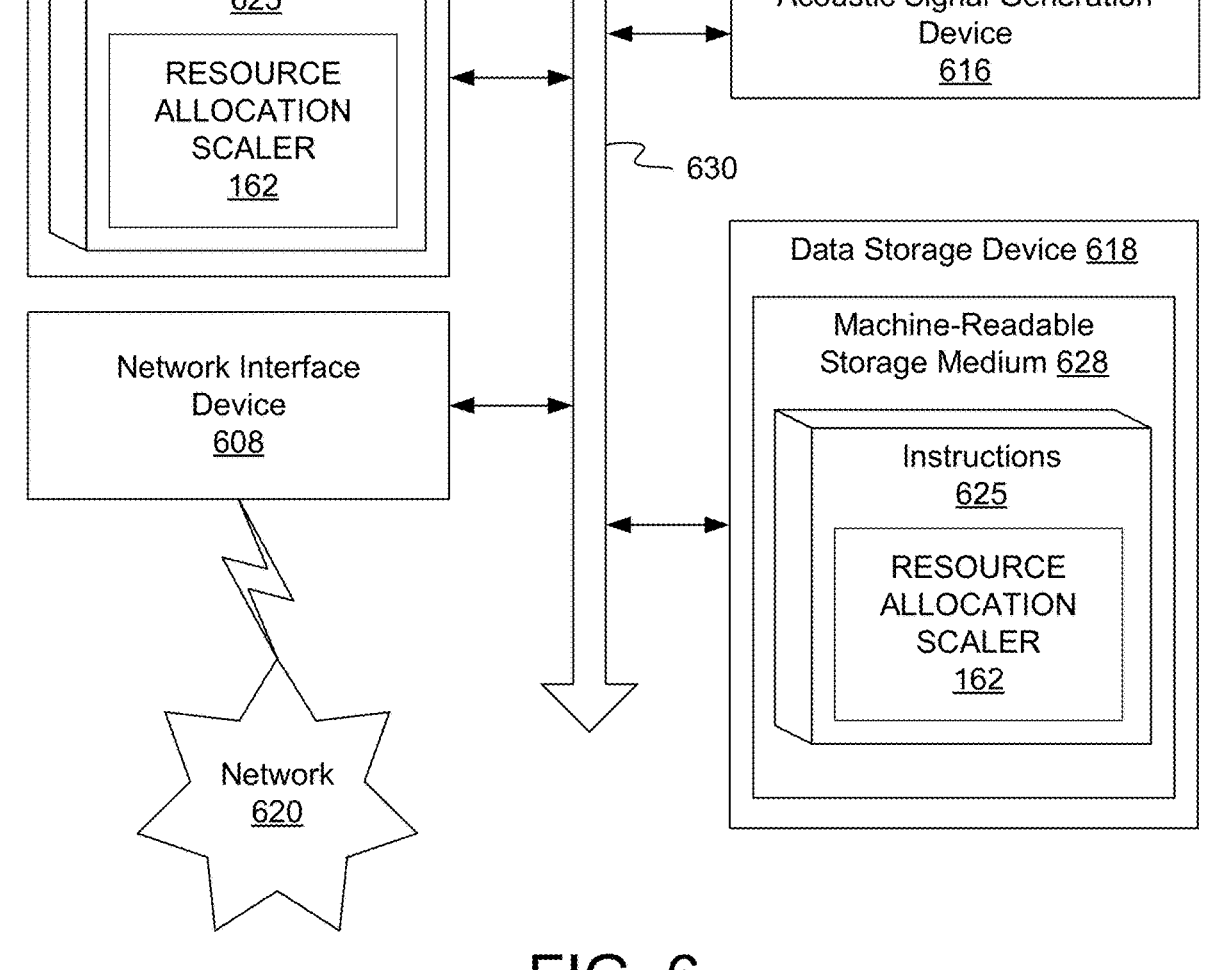
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine.

Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a non-volatile memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a non-transitory computer-readable storage medium 628 on which may be stored one or more sets of instructions 625 that may include instructions for managing resource allocation, e.g., the resource allocation scaler 162 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "scanning," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "con-figured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unpro-grammed generic computer, or an unprogrammed program-mable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodi-ments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing resource allocation in a data storage environment, the method comprising:
   identifying one or more storage nodes of hierarchy on a common hierarchy level as a management group;
   monitoring, with an assigned autoscaler, resource utiliza-tion of processing resources and memory resources in a subset of the one or more storage nodes in the management group;
   based on the monitored resource utilization in the subset of the one or more storage nodes, determining, by a processing device, a scaling factor for allocating resources to an unmonitored storage node in the man-agement group, the unmonitored storage node being out of the subset and not monitored with the assigned autoscaler;
   adjusting resources, in the subset of the one or more storage nodes using the autoscaler, wherein the resources do not idle and are scaled for processing tasks of the subset of the one or more storage nodes; and

adjusting the resource allocation using the scaling factor in the unmonitored storage node.

2. The method of claim 1, wherein the one or more storage nodes of hierarchy comprise one or more object storage daemons (OSDs) of a controlled replication under scalable hashing (CRUSH) group.

3. The method of claim 2, wherein the one or more OSDs are on the common hierarchy level of pods in the CRUSH group.

4. The method of claim 1, wherein determining the scaling factor comprises:
   evaluating, by the autoscaler, a surplus or a deficit of resource utilization in the subset of the one or more storage nodes during adjustment; and
   computing the scaling factor in view of a weight of the unmonitored storage node.

5. The method of claim 1, wherein the resource allocation comprises at least one of: a bandwidth for data processing, a share of a total computational capacity, a share of available memory resource, a portion of input and output bandwidth, or a share of communication bandwidth.

6. The method of claim 5, wherein adjusting the resource allocation further comprises:
   adjusting the subset of the one or more storage nodes in the management group based on resources consumed on monitoring the resource allocation; or
   adjusting the unmonitored storage node in the manage-ment group based on the resources consumed on moni-toring the resource allocation.

7. An apparatus for managing resource allocation in a data storage environment, the apparatus comprising:
   a memory; and
   a processing device operatively coupled to the memory, the processing device and the memory to:
      identify one or more storage nodes of hierarchy on a common hierarchy level as a management group;
      monitor, with an assigned autoscaler, resource utiliza-tion of processing resources and memory resources in a subset of the one or more storage nodes in the management group;
      based on the monitored resource utilization in the subset of the one or more storage nodes, determine, by a processing device, a scaling factor for allocating resources to an unmonitored storage node in the management group, the unmonitored storage node being out of the subset and not monitored with the assigned autoscaler;
      adjust resources, in the subset of the one or more storage nodes using the autoscaler, wherein the resources do not idle and are scaled for processing tasks of the subset of the one or more storage nodes; and
      adjust the resource allocation using the scaling factor in the unmonitored storage node.

8. The apparatus of claim 7, wherein the one or more storage nodes of hierarchy comprise one or more object storage daemons (OSDs) of a controlled replication under scalable hashing (CRUSH) group.

9. The apparatus of claim 8, wherein the one or more OSDs are on the common hierarchy level of pods in the CRUSH group.

10. The apparatus of claim 7, wherein the processing device and the memory are to determine the scaling factor by:
   evaluating, by the autoscaler, a surplus or a deficit of resource utilization in the subset of the one or more storage nodes during adjustment; and computing the scaling factor in view of a weight of the unmonitored storage node.

11. The apparatus of claim 7, wherein the resource allocation comprises at least one of: a bandwidth for data processing, a share of a total computational capacity, a share of available memory resource, a portion of input and output bandwidth, or a share of communication bandwidth.

12. The apparatus of claim 11, wherein the processing device and the memory are to adjust the resource allocation by:

adjusting the subset of the one or more storage nodes in the management group based on resources consumed on monitoring the resource allocation; or adjusting the unmonitored storage node in the management group based on the resources consumed on monitoring the resource allocation.

13. A non-transitory computer-readable storage medium having instructions stored thereon that, when executed by a processing device to manage resource allocation in a data storage environment, cause the processing device to:

identify one or more storage nodes of hierarchy on a common hierarchy level as a management group;

monitor, with an assigned autoscaler, resource utilization of processing resources and memory resources in a subset of the one or more storage nodes in the management group;

based on the monitored resource utilization in the subset of the one or more storage nodes, determine, by a processing device, a scaling factor for allocating resources to an unmonitored storage node in the management group, the unmonitored storage node being out of the subset and not monitored with the assigned autoscaler;

adjust resources, in the subset of the one or more storage nodes using the autoscaler, wherein the resources do not idle and are scaled for processing tasks of the subset of the one or more storage nodes; and adjust the resource allocation using the scaling factor in the unmonitored storage node.

14. The non-transitory computer-readable storage medium of claim 13, wherein the one or more storage nodes of hierarchy comprise one or more object storage daemons (OSDs) of a controlled replication under scalable hashing (CRUSH) group, wherein the one or more OSDs are on the common hierarchy level of pods in the CRUSH group.

15. The non-transitory computer-readable storage medium of claim 13, wherein to determine the scaling factor is to:

evaluate, by the autoscaler, a surplus or a deficit of resource utilization in the subset of the one or more storage nodes during adjustment; and compute the scaling factor in view of a weight of the unmonitored storage node.

16. The non-transitory computer-readable storage medium of claim 13, wherein the resource allocation comprises at least one of: a bandwidth for data processing, a share of a total computational capacity, a share of available memory resource, a portion of input and output bandwidth, or a share of communication bandwidth.

17. The non-transitory computer-readable storage medium of claim 16, wherein to adjust the resource allocation further comprises:

to adjust the subset of the one or more storage nodes in the management group based on resources consumed on monitoring the resource allocation; or to adjust the unmonitored storage node in the management group based on the resources consumed on monitoring the resource allocation.

* * * * *